US008768777B2

(12) United States Patent
Lin

(10) Patent No.: US 8,768,777 B2
(45) Date of Patent: Jul. 1, 2014

(54) TRACKING ASSETS BETWEEN ORGANIZATIONS IN A CONSORTIUM OF ORGANIZATIONS

(75) Inventor: Tao Lin, Palo Alto, CA (US)

(73) Assignee: SAP AG, Walldorf (DE)

( * ) Notice: Subject to any disclaimer, the term of this patent is extended or adjusted under 35 U.S.C. 154(b) by 2104 days.

(21) Appl. No.: 11/214,992

(22) Filed: Aug. 31, 2005

(65) Prior Publication Data

US 2007/0050261 A1    Mar. 1, 2007

(51) Int. Cl.
*G06G 1/14*    (2006.01)

(52) U.S. Cl.
USPC ............. 705/22; 705/28; 340/10.1; 340/10.4; 370/254; 370/255; 370/256

(58) Field of Classification Search
CPC combination set(s) only.
See application file for complete search history.

(56) References Cited

U.S. PATENT DOCUMENTS

| | | | |
|---|---|---|---|
| 4,974,166 A | | 11/1990 | Maney et al. |
| 5,166,884 A | | 11/1992 | Maney et al. |
| 5,469,363 A | | 11/1995 | Saliga |
| 5,936,527 A | | 8/1999 | Isaacman et al. |
| 5,963,134 A | | 10/1999 | Bowers et al. |
| 5,971,592 A | | 10/1999 | Kralj et al. |
| 6,006,100 A | * | 12/1999 | Koenck et al. ............. 455/466 |
| 6,021,443 A | | 2/2000 | Bracho et al. |
| 6,032,127 A | | 2/2000 | Schkonick et al. |
| 6,148,291 A | | 11/2000 | Radican |
| 6,177,860 B1 | | 1/2001 | Cromer et al. |
| 6,195,006 B1 | | 2/2001 | Bowers et al. |
| 6,259,367 B1 | | 7/2001 | Klein |
| 6,292,894 B1 | | 9/2001 | Chipman et al. |
| 6,301,621 B1 | | 10/2001 | Haverstock et al. |
| 6,321,230 B1 | | 11/2001 | Joslin et al. |
| 6,321,241 B1 | * | 11/2001 | Gartung et al. .............. 715/210 |
| 6,671,698 B2 | | 12/2003 | Pickett et al. |
| 6,684,119 B2 | | 1/2004 | Burnard et al. |
| 6,785,674 B2 | * | 8/2004 | Vu ........................................ 1/1 |
| 6,859,831 B1 | * | 2/2005 | Gelvin et al. ................. 709/224 |

(Continued)

FOREIGN PATENT DOCUMENTS

| | | |
|---|---|---|
| DE | 4341880 | 6/1995 |
| DE | 19623893 | 12/1997 |

(Continued)

OTHER PUBLICATIONS

Hoffman, Kurt C., "Real-time Location Systems Take Asset Tracking to New Level," http://www.supplychainbrain.com/archives/10.01, Oct. 2001, 5 pgs., XP002259982.

(Continued)

*Primary Examiner* — M. Thein
(74) *Attorney, Agent, or Firm* — Fish & Richardson P.C.

(57) ABSTRACT

A system includes a network of auto-id nodes and a processor. Each auto-id node includes index data that defines a hierarchical relationship between the auto-id node and another auto-id node within the network, and the auto-id nodes include a storage for storing status and history data about one or more assets that have been read by the auto-id node. The processor is operable to extract data from the network of auto-id nodes by following index data within the auto-id nodes to query only selected auto-id nodes within the network, and the selected nodes are arranged in a hierarchical network defined by indices of the auto-id nodes.

20 Claims, 9 Drawing Sheets

(56) References Cited

U.S. PATENT DOCUMENTS

| | | | |
|---|---|---|---|
| 7,119,676 B1* | 10/2006 | Silverstrim et al. | 340/531 |
| 7,307,526 B2* | 12/2007 | Rajapakse et al. | 340/572.1 |
| 2001/0000019 A1 | 3/2001 | Bowers et al. | |
| 2005/0006469 A1 | 1/2005 | Nonneman et al. | |
| 2005/0143133 A1* | 6/2005 | Bridgelall | 455/562.1 |
| 2006/0116170 A1* | 6/2006 | Brahmbhatt et al. | 455/560 |
| 2006/0164213 A1* | 7/2006 | Burghard et al. | 340/10.2 |

FOREIGN PATENT DOCUMENTS

| | | |
|---|---|---|
| DE | 19844631 | 4/2000 |
| DE | 19951060 | 5/2000 |
| DE | 19955120 | 5/2001 |
| EP | 0908643 | 4/1999 |
| EP | 0913758 A2 | 5/1999 |
| EP | 1174807 A1 | 1/2002 |
| GB | 2308947 | 7/1997 |
| JP | 2002-351949 | 12/2002 |
| WO | WO 00/45324 | 8/2000 |
| WO | WO 02/47014 | 6/2002 |

OTHER PUBLICATIONS

"KnowNow Unveils 'n-way' EAI over the Internet," Searchwebservices, Jun. 28, 2001, 2 pgs., XP002259981.

Margulius, David L., "Dawn of Real-time enterprise," Infoworld, http://www.infoworld.com/article/02/01/17/020121fetca_1.html, Jan. 17, 2002, 2 pgs., XP002259980.

Murray, Charles J., "Motorola cuts bar code replacement effort," *EE Times*, Nov. 16, 2001, retrieved from the Internet on Nov. 29, 2004, at http://www.eet.com/story/OEG20011116S0111, 1 pg.

RFID—Wikipedia, the free encyclopedia, "RFID", reprinted from http://en.wikipedia.org/wiki/RFID, printed on Aug. 31, 2005 (12 pages).

Rosen, Cheryl, "RFID Chips Put To The Test," Informationweek. com, Jul. 2, 2001, retrieved from the Internet on Nov. 29, 2004, at http://www.informationweek.com/story/IWK20010628S0008.

Bornhovd, "Integrating Smart items with Business Processes An Experience report," *Proceedings of the 28$^{th}$ Hawaii International Conference on System Sciences*, 2005, 8 pages.

'Technical Manual The Savant Version 0.1 (Alpha)' [online]. Auto-ID Center, 2002, [retrieved on Nov. 13, 2006]. Retrieved from the Internet: <URL: www.autoidlabs.org/uploads/media/MIT-AUTOID-TM-003.pdf>, 46 pages.

Translation of Office Notice of Rejection from Japanese Patent Office dated Sep. 11, 2009 for Application No. 2006-198003, 2 pages.

* cited by examiner

TRACKING ASSETS BETWEEN ORGANIZATIONS IN A CONSORTIUM OF ORGANIZATIONS

TECHNICAL FIELD

This description relates to automatic identification, tracking and handling of assets.

BACKGROUND

Auto-identification (auto-id) systems are used, for example, to identify or otherwise obtain information about products that are to be manufactured, bought or sold, transported, or otherwise used in commerce. For example, information regarding a physical object, such as a box in a backroom, may be stored in association with a tag or other identifier that is affixed to the box, and/or an object tagged with a unique identifier may be located on a shelf in a retail store. Then, some sort of device, such as a reader or sensor, may be used to identify the physical object, using the identifier, and thereby determine, capture, and use the information stored in a computer system with respect to the box or the object, such as, for example, a brand name of the object or an expiration date of the object.

One example of an auto-id system is known as a Radio-Frequency Identification (RFID) system. RFID generally refers to technologies in which a unique number (and/or other identifying information) is stored on a microchip that is associated with an antenna within an RFID tag or transponder. A reader is used to communicate with the antenna and obtain the unique number from the microchip, and thereby obtain information associated with the unique number. Advantageously, RFID is fast and wireless, does not require a direction or line-of-sight to enable communication between readers and tags, and reduces or eliminates the need for human data entry. As a result, RFID may be used in many applications, such as, for example, identification of tagged objects within stores or warehouses, automatic payment of tolls by cars with RFID tags, and/or identification of authorized personnel for entry into a restricted area.

Many types of auto-id system devices exist. Examples include 2D bar code scanners, smart card devices/readers, optical character recognition systems, and biometric systems (e.g., retinal and fingerprint scans). Many or all such systems have the ability or the potential to reduce costs, increase efficiency, improve data accuracy, provide data with more granularity (even down to the single item/object level), and thereby improve customer satisfaction within the operations of an enterprise system.

SUMMARY

In a first general aspect, a system includes a network of auto-id nodes and a processor. Each auto-id node includes index data that defines a hierarchical relationship between the auto-id node and another auto-id node within the network, and the auto-id nodes include a storage for storing status and history data about one or more assets that have been read by the auto-id node. The processor is operable to extract data from the network of auto-id nodes by following index data within the auto-id nodes to query only selected auto-id nodes within the network, and the selected nodes are arranged in a hierarchical network defined by indices of the auto-id nodes.

Implementations can include one or more of the following features. For example, the assets can be physical objects. The assets can be associated with an identifier that is identified by the auto-id nodes. The identifier can be an RFID tag. The auto-id nodes can be operable to track a time at which the assets is identified with the auto-id node.

The auto-id nodes can further include an auto-identification device in communication with at least one node and operable to receive data provided from the nodes about progress of the asset through auto-ID system. The system can further include a user interface operable to receive an identifier of the asset. The network of auto-id nodes can include auto-id nodes that are associated with a single organization. Different auto-id nodes within the network of auto-id nodes can be associated with different organizations.

In another general aspect, a method includes, within a network of auto-id nodes that each comprise a storage for storing status and history data about one or more assets that have been read by the auto-id node, defining hierarchical relationships between different auto-id nodes in an auto-ID system, storing an index relating a first auto-id node to a second auto-id node in the first auto-id node, and extracting data from the network of auto-id nodes by following index data within the auto-id nodes to query only selected auto-id nodes within the network, wherein the selected nodes are arranged in a hierarchical network defined by indices of the auto-id nodes.

Implementations can include one or more of the following features. For example, the assets can be physical objects. The method can further include associating the assets with an identifier that is identified by the nodes. The identifier can be an RFID tag.

The method can further include storing timing data about a time at which an asset is identified by an auto-id node. The network of auto-id nodes can include auto-id nodes that are associated with a single organization. Different auto-id nodes within the network of auto-id nodes can be associated with different organizations.

In anther general aspect, a machine-readable storage medium includes executable instructions for causing a one or more processors to define hierarchical relationships between different auto-id nodes in an auto-ID system within a network of auto-id nodes that each comprise a storage for storing status and history data about one or more assets that have been read by the auto-id node, to store an index relating a first auto-id node to a second auto-id node in the first auto-id node, and to extract data from the network of auto-id nodes by following index data within the auto-id nodes to query only selected auto-id nodes within the network, wherein the selected nodes are arranged in a hierarchical network defined by indices of the auto-id nodes.

Implementations can include one or more of the following features. For example, the storage medium can further include executable instructions for causing the one or more processors to associate the assets with an identifier that is identified by the nodes. The identifier can be an RFID tag. Different auto-id nodes within the network of auto-id nodes can be associated with different organizations.

The details of one or more implementations are set forth in the accompanying drawings and the description below. Other features will be apparent from the description and drawings, and from the claims.

DETAILED DESCRIPTION

Figure 1:
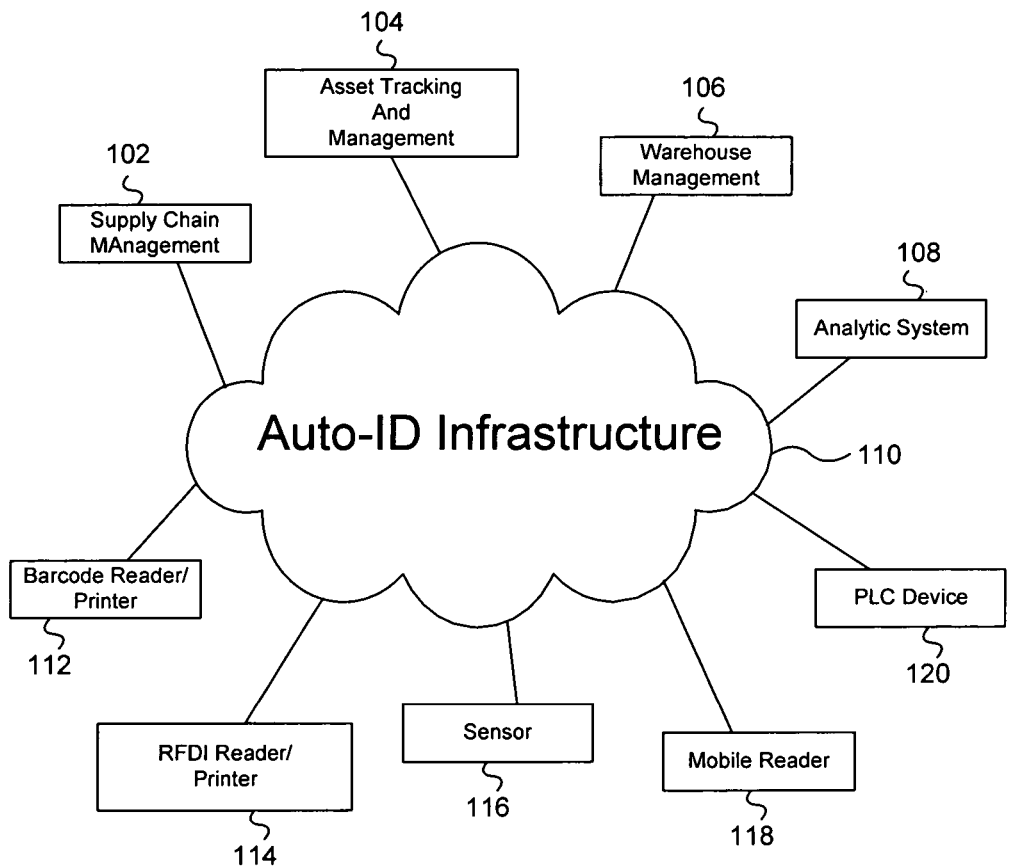
FIG. 1 is a network diagram of an auto-id system.

FIG. 1 is a network diagram of an auto-id system 100. In FIG. 1, a plurality of enterprise applications include, as examples, a supply chain management application 102, which may be used by an enterprise to oversee a process of producing/buying, shipping, or selling of the products or services of the enterprise. An asset tracking and management system 104 may be used, for example, to monitor and track a number of assets within or across a site, an organization, or across organizations, in order to determine what assets, e.g., inventory assets, are available or unavailable to, or desired by, the enterprise. A warehouse management application 106 may be used to oversee the receiving, stocking, selection, and shipping aspects of a warehouse. An analytic system 108 may be used to quantify aspects of the operations of the enterprise, such as, for example, speed of response to consumer requests, loss resulting from theft, or other factors that may impact a profit or operation of the enterprise.

The examples of enterprise applications illustrated in FIG. 1 illustrate the need of an enterprise to gather, share, and use data that is common to the enterprise systems. For example, the supply chain management application 102 may need to know how much of a certain type of asset is currently available, based on data within the asset management application 104. The analytic system 108 may extract data from the auto-id middleware and also from the other applications 102, 104, or 106, in order, for example, to discover performance issues (such as storage usage, reasons for delivery delay, or to validate progress of an item through a supply chain), problems (such as product counterfeit patterns), and the general visibility of the physical object (item, case, pallet). The analytic system 108 may report the discovered results through a portal system.

Much of the data to be shared and used by enterprise applications, such as, for example, those just described, relates to the products or services that are bought and/or sold by the enterprise systems. In FIG. 1, information regarding theses products or services is obtained by the applications through the use of a middleware infrastructure 110, which implements an auto-identification (auto-id) system for automatically obtaining and sharing information related to the products and services to be bought and/or sold.

Generally, auto-id systems, as referred to above, enable the automatic gathering and use of information related to products sold or used by the enterprise, and include identifiers and readers for obtaining information about the identifiers. In FIG. 1, examples of auto-id elements include a barcode reader/printer 112, which may be used to read or print barcode labels (to be) attached to an object. An RFID reader/printer 114 is shown, which, as should be understood from the above discussion of RFID systems, may be used to read information from, or assign information to, an RFID tag attached to an object. A sensor 116 may refer to, for example, an environmental sensor (e.g., a thermometer), or a voice or an optical character recognition sensor. A mobile reader 118 refers, as its name implies, to a reader that may be carried by a user for detecting, for example, an RFID tag or other auto-id identifier. Finally in FIG. 1, a Programmable Logic Controller (PLC) device represents a digital controller used for applications such as on/off control, timing, logic, counting and sequencing, and also may be controlled by a device controller system, described in more detail below. Other devices, such as biometrics device, can also be used here. Only some examples are listed here.

As shown in FIG. 1, then, information obtained by any of the auto-id devices/systems 112-120 may be communicated to, shared between, and used by, any of the enterprise applications 102-108. In this way, the enterprise may obtain and use information that is essentially real-time, across an entire spectrum of its operations. Further, the enterprise may share information with other enterprises. For example, the supply chain management application 102 may be associated with a first enterprise (e.g., a retail store), while the warehouse management application may be associated with a second enterprise (e.g., a manufacturer). By obtaining information from the auto-id devices/systems 112-120, and sharing this and other information across the middleware infrastructure 110, the two enterprises may increase an efficiency of both of their respective operations.

Figure 2:
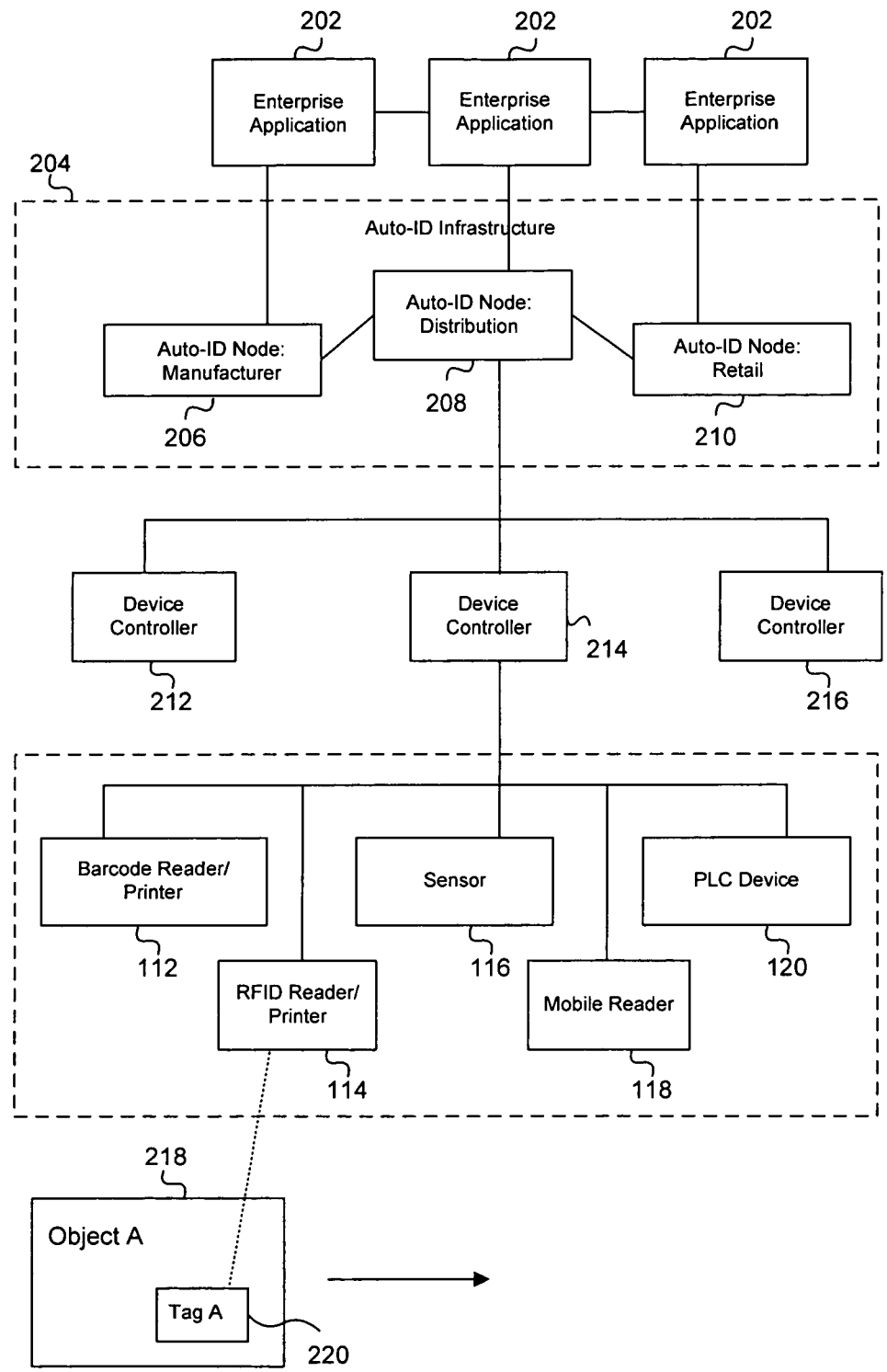
FIG. 2 is a block diagram of a system illustrating examples of the auto-id features of FIG. 1, including an auto-id infrastructure having an auto-id node(s) and a device controller(s).

FIG. 2 is a block diagram of a system 200 illustrating examples of the auto-id features of FIG. 1. In FIG. 2, enterprise applications 202 may include the various applications 102-108 discussed above, as well as various other enterprise applications.

An auto-id infrastructure 204 represents some or the entire middleware infrastructure 110 of FIG. 1. In particular, the auto-id infrastructure 204 includes auto-id nodes 206, 208, and 210. The auto-id nodes 206, 208, and 210 generally represent nodes at defined locations that are designed to associate information obtained by the auto-id devices 112-120 with existing business logic or data. Further, the auto-id nodes 206, 208, and 210 may be used to store historical information for products or objects that have been tracked by the auto-id devices/systems 112-120. Such historical information may include, for example, status information at a particular time, object location, environmental information related to the tracked object(s) or to a specific location, and information for multiple objects that has been collected and combined for a desired purpose.

The auto-id nodes 206, 208, and 210 may be strategically placed throughout the enterprise, or across multiple enterprises. For example, one or more auto-id nodes 206 may be located at a manufacturing site, while auto-id nodes 208 may be located at a retail product distribution site, and auto-id nodes 210 may be located at a retail store. Additionally, one or more auto-id nodes can be provided at sites of a raw materials supplier, a manufacturing plant, a manufacturing distribution center, and a transportation service. In this way, information that is particular to an actual setting of an auto-id node may be obtained and retained only at that particular node.

For example, the auto-id node 210 at a retail store may be used to track a retail price of an item, or a number of items on a shelf of the retail store. Such information may not be useful to the auto-id node 206 at a manufacturing plant location, but may be partially useful to the auto-id node 208 at the retail distribution location. For example, the auto-id node 208 at the retail distribution location may not be interested in the retail price of an item, but may be interested in a number of presently-shelved items (for purposes of re-stocking).

Similarly, business processes and business logic at the different sites may benefit from the use of the localized auto-id nodes 206, 208, and 210. For example, the retail auto-id node 210 may include a workflow for preventing theft of objects, while the manufacturing auto-id node 206 may be interested in monitoring a quantity of objects produced in a particular time period. Thus, by using a dispersed network of localized auto-id nodes, the system 200 may process information more efficiently, and in a manner that is more useful to the users at the various locations.

Each auto-id node in the system 200 generally includes one or more device controllers, illustrated in FIG. 2 as device controllers 212, 214, and 216, which are associated with the distribution auto-id node 208. Of course, each of the auto-id nodes 206, 208, and 210 may have fewer or greater numbers of device controllers, or may not use device controllers at all.

Referring to the device controller 214 as an example, FIG. 2 illustrates that the device controller 214 may be used to oversee and coordinate the operation of some or all of the auto-id devices 112-120. Of course, the device controllers 212 and 216 may be used to oversee the operations of similar auto-id devices that may be connected to those device controllers.

More specifically, the device controller 214 may be used to process data from the auto-id devices 112-120, so as to increase an efficiency of its associated auto-id node 208. For example, the device controller 214 may remove extraneous information, or may combine or modify data in a manner specified by the auto-id node 208 in a way that is useful to the distribution function of that auto-id node, and/or in a way that is useful to the enterprise applications 202.

Thus, the device controller 214 coordinates and manages the auto-id devices 112-120, perhaps based on instructions from the auto-id node 208, and relays (processed) information from the auto-id devices to the auto-id node 208. For example, the auto-id node 208 may be used to instruct the device controller 214 to obtain a particular class of data (such as, for example, quantity) with respect to an object 218 (for example, a toy or other item to be distributed to retailers for sale). Then, the device controller 214 may use the RFID reader/printer 114 to obtain this information from a tag 220 associated with the object 218, and may then remove any undesired information that is concurrently obtained before passing on the information that a certain number of the object in question is available to the auto-id node 208.

As another example, the auto-id node 208 may instruct the device controller 214 to assign information to the object 218. For example, the device controller 214 may use the RFID reader/printer 114 to change a current price of the object 218 (e.g., to store new price information on, or in association with, the RFID tag 220 attached to a certain class of object).

From FIG. 2, it should be understood that, just as each of the device controllers 212, 214, and 216 may be used to filter, aggregate, write, or otherwise manipulate data with respect to all of its associated auto-id devices and/or environment devices 112-120, the auto-id node 208 is operable to filter, aggregate, assign, or otherwise manipulate data for its associated device controllers 212, 214, and 216. In this way, the auto-id node 208 may integrate information from its device controllers 212, 214, and 216 with business processes that may be operational on one or more of the enterprise applications 202.

By extension, it may be seen that the enterprise applications 202 are operable to aggregate information from all of the auto-id nodes 216, 218, and 210. Further, it should be understood that information that is useful at one level of the system 200 may not be as useful at another level. For example, the enterprise applications 202 may not be interested in, or able to use, low-level (e.g., item-level) information that is collected by the reader/printer 114. Rather, the enterprise applications 202 may only be interested in that information to the extent that the information is filtered and/or aggregated by the device controller 214 and/or the auto-id node 208.

As a result of the described architecture, it should be understood that business logic from the enterprise application 202, and/or from multiple enterprise applications, may be supported in the auto-id middleware 110. Further, such multiple enterprise applications may be supported with a single physical hardware system and a single auto-id middleware that are common to all of the enterprise applications.

Figure 3:
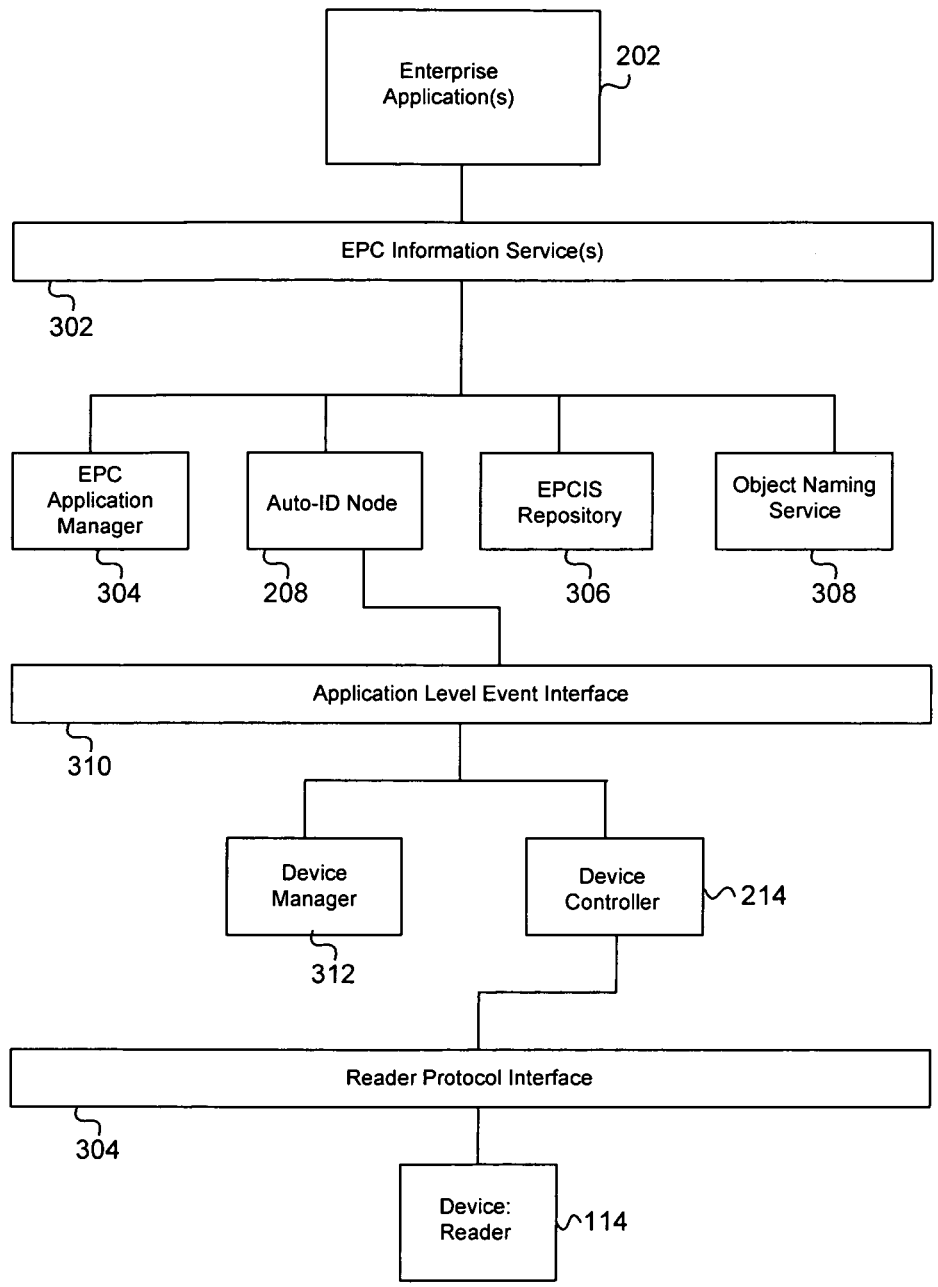
FIG. 3 is a block diagram of a network architecture for use with the auto-id infrastructure of FIG. 2.

FIG. 3 is a block diagram of a network architecture 300 for use with the auto-id infrastructure 204 of FIG. 2. More specifically, FIG. 3 illustrates an architecture by which the auto-id infrastructure 204 of FIG. 2 may be used with an Electronic Product Code (EPC) that has been developed for use with auto-id systems.

The EPC refers to a unique number, similar to a Uniform Product Code (UPC) identifier, that has a pre-defined format and scheme that multiple organizations and enterprises have agreed to use in uniquely designating and identifying their respective products, goods, services, or collections thereof (e.g., pallets, cases, or truck-loads). In the context of RFID systems, then, the EPC may be assigned to the tag 220 on the object 218 of FIG. 2. A classic EPC, for example, is defined by four fields: header field (to distinguish different formats), manufacture field (each organization that assigns the EPC has its own manufacture field), product field (product code), and serial number (with the product).

In FIG. 3, an EPC Information Services (EPCIS) layer 302 allows the exchange of EPC data over a network. That is, EPCIS provides a standard format or protocol by which a reader that has identified an EPC number may find and use information about that number (and hence, about its associated item). In some implementations, and/or in related implementations, a language such as, for example, the Physical Mark-up Language (PML) and/or the eXtensible Mark-up Language (XML) may be used for the above-described transfer and use of business-level EPC information The EPCIS layer 302 receives information from an application manager 304, which is generally operable to oversee information events (e.g., tag reads) and manage the events for communication to the EPCIS layer 302 and thereby to an EPCIS repository 306. The application manager 304 operates to monitor and configure the repository 306 as the repository 306 accumulates data over relatively long periods of time during which the data may not be immediately useful to any particular application or device. Generally speaking, a flow of information for a number of objects may be too great for the repository 306 to be practically useful in real-time, particularly given potential network delays. Rather, the auto-id node 208 of FIG. 2 may be used to track such information, perhaps for some fixed period of time, that may be immediately useful to the auto-id node 208.

The application manager 304 and EPCIS layer 302 have access to an Object Naming Service (ONS), which, similarly to a Domain Name Service (DNS), is a look-up service that allows the application manager 304 and EPCIS layer 302 to find information about a product, based on the EPC code for that product. The ONS 308 may have different levels of information, which may be classified, for example, by whether the information is stored locally or non-locally to the product.

An application level event (ALE) interface layer 310 provides an interface to a device manager 312 and the device controller 214. More specifically, the ALE interface layer 310 may be used to filter or aggregate information events, as received from the device manager 312 and/or the device controller 214. The device manager 312 may be used to manage a status and/or configuration of the device controller 214.

Also shown in FIG. 3, a reader protocol interface layer 314 provides an interface for the device 114. That is, it should be understood that different enterprises may employ different types of the device 114, or other auto-id devices, and these devices and enterprises may make use of different reader protocols for communicating with the readers. The reader protocol interface 314 is designed to enable communication with all readers within the system 300.

It should be understood from FIG. 3 that the system 300 may be used without the auto-id infrastructure 204 of FIG. 2, and, conversely, the auto-id infrastructure 204 of FIG. 2 may be used without other elements of FIG. 3. Thus, FIG. 3 illustrates that the auto-id infrastructure 204 of FIG. 2 may be used with, but does not require the use of, the EPC network and standard.

Figure 4:
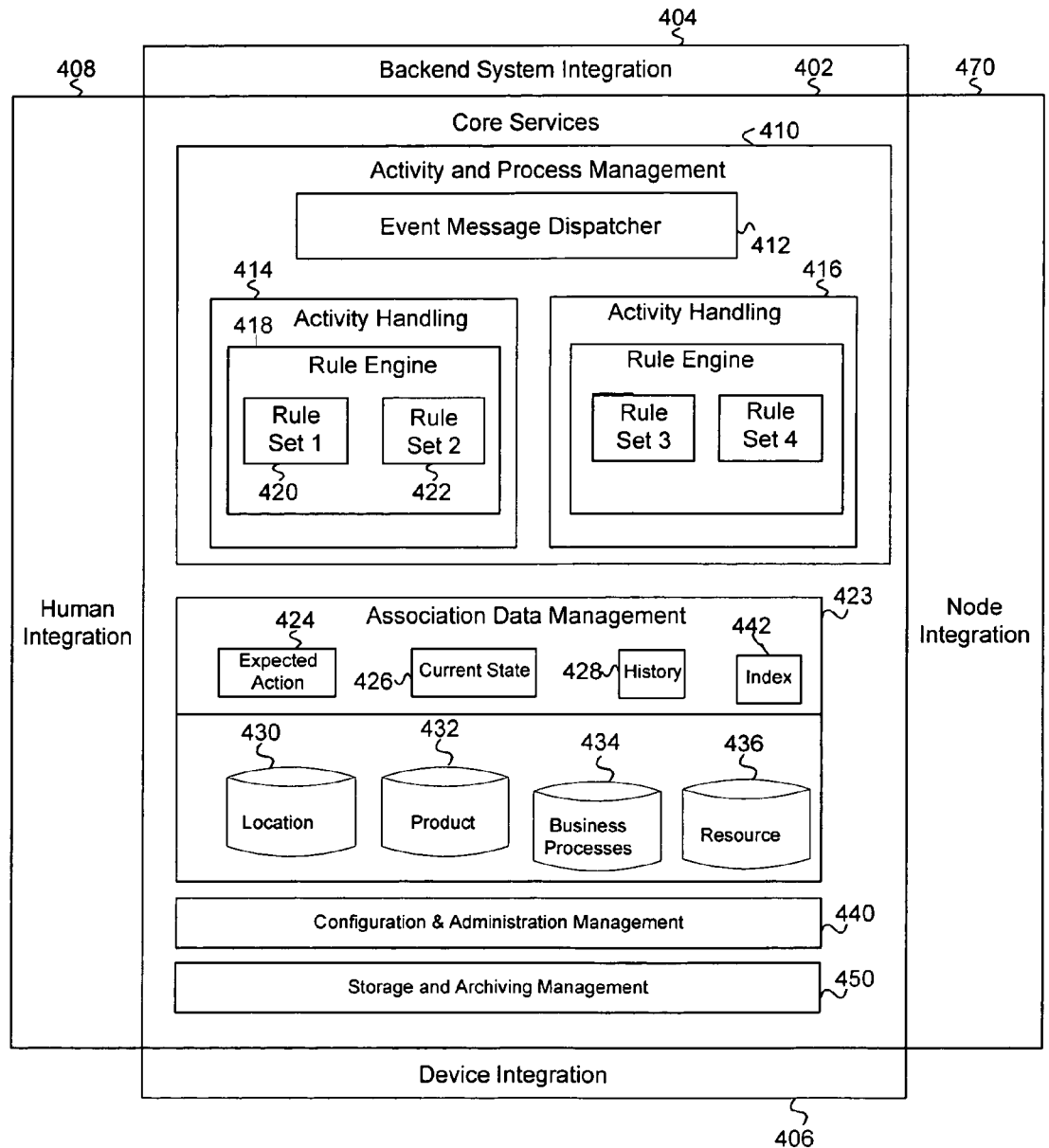
FIG. 4 is a block diagram of the auto-id node(s) of FIGS. 2 and 3.

FIG. 4 is a block diagram of the auto-id node(s) 206, 208, and 210 of FIGS. 2 and/or 3. As shown in FIG. 4, a core services module 402 handles implementation details of, for example, the auto-id node 208, as discussed in more detail below, while various integration modules 404, 406, 408, and 470 handle communication, configuration, and management details of the core services module 402 relative to external features, users, and services.

For example, the backend system integration layer 404 handles communication between the auto-id node 400 and backend systems, such as, for example, the applications 102-108 of FIG. 1, or the application 202 of FIG. 2.

The device integration layer 406 handles communication between the auto-id node 400 and devices. For example, the device integration layer 406 may enable communications between the node 208 and the device controller 214 of FIG. 2. In some implementations the device integration layer 406 may enable communications directly with one or more of the tracking devices 112-118.

The human integration layer 408 handles communication between the auto-id node 400 and user interfaces. For example, an auto-id node operator may configure an auto-id node to perform certain tasks through a user interface, or monitor the information that the auto-id node receives. The operator also may obtain alert messages from the auto-id node in case of, for example, an unexpected event or a malfunction. Further, security of the auto-id node 400 may be monitored, so that only authorized personnel may interact with the auto-id node 400.

The node integration layer 470 handles communication between the auto-id node 400 and other auto-id nodes. For example, multiple neighboring auto-id nodes together may track an object through a distribution or supply chain, in order to provide routing information for the object, or to determine whether additional units of the object should be purchased or stocked.

The core services module 402 includes an activity and process management module 410. The activity and process management module 410 analyzes information associated with an event experienced by an object, such as, for example, a read or tracking event in which tag information is read from (for example) the tag 220 of object 218 by the RFID reader 114 in FIG. 2. Then, the activity and process management module 410 matches this information with known information that is related to the particular object.

For example, as described in more detail below, each tracked object may be associated with one or more business processes, also referred to as, for example, a business process model(s), or a workflow(s). Such processes generally describe all known or anticipated possibilities that may be experienced by an object during some or all of its lifetime, i.e., from manufacturing to distribution, or from distribution to retail sale, or from manufacturing to retail sale. In this sense, the auto-id node may require all of the lifetime information for a particular object, or may require only some sub-set of the lifetime information, depending on the duties of the particular auto-id node 400.

Thus, actual, current event information (e.g., information read from the tag 220 by the reader 114), combined with previously-detected event information, as well as anticipated event information (derived from the relevant business process model), allows the auto-id node 400 to make determinations regarding a status of the tracked object(s). In this way, the auto-id node 400 is able to identify and track an object through a supply chain, or some other business model (e.g., a customer return of merchandise), in an efficient, cost-effective manner, with minimal human intervention or supervision.

The activity and process management module 410 includes an event message dispatcher 412. The event message dispatcher 412 receives events from different sources, where, as referenced above, the term event generally may refer to an occurrence triggered by an activity of, for example, one or more of the tracking devices 112-118 of FIG. 1.

In some implementations, such events may be represented as software/data packets that are received at the event message dispatcher 412 from any number of sources. In addition to the tracking devices 112-118, an event may be received from a local operator by way of the human integration module 408. Events also may be received from, for example, the backend system 404, or from another auto-id node.

These different sources of the events may share a same or similar format in describing the various events. For example, the different sources of events may use a universal event descriptor protocol to describe the event. The event description may include, for example, a designated an object identifier, an event type (e.g., a RFID read event), an event source (e.g., the RFID reader 114), a time stamp, a location of the event source, an event subject identifier, or other information.

As one specific example, the reader device 114 may send an event of type "scanning," from a RFID reader having an id "abcd1234," associated with time "10:23 AM Dec. 21, 2004," and having an object-specific identifier that is unique to the object that was scanned. In this way, events from different sources may be received in the event message dispatcher 412 in a compatible format, so that the event message dispatcher 412 may handle the incoming events in the same or similar manner, regardless of the source(s) of events.

The event message handler 412 analyzes some or all of the information referenced above, or other information, and dispatches the incoming events to one or more activity handlers 414 or 416, accordingly. For example, an event may be dispatched to one of the other activity handlers 414, 416 based on the type of the event, (e.g., a device reader event, or a neighboring auto-id node event, or a backend system event), the time of the event (e.g., whether the event is a day time event or a night time event), or virtually any other criteria by which the activity handlers may be delegated to handle the events.

The activity handler 414, 416 analyzes the information about an event contained therein, along with any known data that may be associated with the event and accessed when needed, and compares this information with a determined business process(es) associated with the object of the event.

In so doing, the activity handler 414, 416 operates to determine one or many future actions that should be taken, if any, in response to the event.

Once determined, the future actions may be communicated outside of the auto-id node 400 for execution thereof. For example, the future actions may be communicated through the integration interfaces 404, 406, 408, and/or 470. In this way, for example, a human operator may be required to perform some action, or an alert may be raised, or a separate auto-id node 204, 206, 208 (or back-end enterprise applications 102-108/202, or device 112-120) may be notified of some required activity. The activity handler 414, 416 also may update its own status and/or tracking data with respect to the object, in order to reflect the changes represented by the event(s), and to reflect more accurately where the object stands in the business process.

The business processes that are associated with the object may be represented in a set of rules, and/or as part of a workflow model that may be associated with the object, and perhaps other objects. For example, a rule may be similar to a conditional clause, stating the different actions to be taken in response to particular conditions or circumstances. That is, a rule may state that if one or more conditions is met with respect to a received event, then one or more action(s) should be taken in response. Types of conditions, decision-making processes, and responsive actions are discussed in more detail below.

To implement such rules, the activity handler 414 includes a rule engine 418 that applies rule sets 420 and 422 to the incoming events at the activity handler 414. The rule engine 418 provides an architecture for programmable rule sets to be applied to events received at the auto-id node 400. The rule engine 418 may, for example, implement a mechanism to search one or more rules in the rule sets 420/422 that may be applied to a received event.

For example, the rule engine may parse the event (that may be formatted in a universal event descriptor protocol, as referenced above), and may calculate and match the selective criteria of each rule set and/or rule to find one or many applicable rule(s). The rule engine 418 also may include a mechanism to execute a rule by activating actions on other parts of the core services 410, and/or communicating action requests on the external modules, users, and services through backend system integration 404, device integration 406, human integration 408 and Node integration 470.

As one example, the event message dispatcher 412 may determine that an incoming event is related to a received shipment of a certain class of devices at a certain location (e.g., a particular docking bay at a warehouse), and may dispatch the event to the activity handler 414, which may be assigned the handling of such events. The activity handler 414 may determine that the event is related to a certain object, and/or has other characteristics (e.g., occurred during a night-time shipment), so as to determine that the rule set 420 within the rule engine 418 is the appropriate rule set to be applied to this type of event. Then, the rule set 420 may be applied to analyze the received event and thereby match a conditional clause of each rule(s) with the information received with respect to the event, along with (possibly) other information, and, if there is a match, may apply the rule to determine the future or expected actions to be taken with respect to the event and the corresponding object.

The rule engine 418 is scalable, so that more rule sets may be added to the rule engine without disruption of its function. Moreover, the rule engine 418 is flexible, so that existing rule sets may be removed or deactivated, for example, at run time or when no longer needed.

The rule set 420 may, for example, be assigned to the activity handler 414, 416 by the backend system by way of the backend system integration module 404, or from one of the other interface modules 406, 408, or 470. Rules also may be added from other auto-id nodes, or from the EPCIS repository 306 of FIG. 3, or from some other source. Since the rule sets 420/422 are modular, they may easily be replaced or modified, without disrupting operations of other rule sets.

As referenced above, the rule engine 418 receives an object-specific event and associates the event with a business process, so as to determine a future or expected action, if any, for the object associated with the event. In so doing, the rule engine 418 may have access to additional data that may be helpful in performing the matching operation. In particular, within the core services 402, an association data management module 423 communicates with the activity and process management module 410, and stores (or accesses) data and services that may be useful in the implementation of the rule sets 420 and 422 by the rule engine 418.

For example, the association data management module 424 may work closely with the activity handler 414, 416 to keep track of the life cycle of each event object, or a portion thereof, and may update the status of the event objects in real-time, in response to receiving an event. For example, the association data management module 423 may include data about the object as it progresses through its lifecycle from, e.g., a raw materials supplier to a manufacturer to a retailer, or from a return of the object until the object is re-packaged for retail sale as a refurbished object.

The association data management module 423 generally tracks two classes of data regarding a particular object(s). Specifically, dynamic data refers to data that change in time, or that may be expected to change, or that have changed as the associated object moves through time. Conversely, static refers to data that generally do not change in time, or that change only infrequently. Different parameters may be considered to by dynamic or static, depending on the object and business process(es) being tracked. For example, an object's location may be considered dynamic, while an object's color or weight may generally be considered static. However, it is possible for an object's color to change, particularly during a manufacturing process, in which case color may be considered a dynamic quality.

Thus, the dynamic data represents the object as it moves through a defined lifecycle or timeline. For example, dynamic data is generally represented in FIG. 4 as including three components: an expected action 424, a current state 426, and a history 428. The expected action 424 includes the expected future events, or possible future events, for an event. Thus, the current state 426 may include the current state of an event, and the history 428 may include a list of past events experienced by the event objects.

As these components are dynamic, the associated data may be modified in response to events that are received with respect to a particular object. For example, the three components 424, 426, 428 may be updated by the activity handler 414, 416 each time an event is received. Specifically, if an event triggers a reception of an object at a loading dock, then the object's current state may be changed from "in transit" in the current state 426 to "received." Then, the previous current state entry may be moved to the history 428, to represent the transit history of the object (e.g., a route traveled during transit). An expected action of "received" in the expected action 424 is re-designated as the current state 426, and the rule engine 414 may use the rule set 420 to determine which of the expected actions still within the expected action 424 should be implemented next (e.g., unloading the object for stocking on store shelves).

The dynamic data may thus be altered at least as often as events are received with respect to a particular object. The number and frequency of events are generally related to a number and availability of readers, so that, in the theoretical limit, an object that is continuously tracked during its lifetime by a large enough number of readers could have dynamic data that changes on a continuous basis.

In contrast, static data is stored within the association data management module 423 within databases or memory that is not generally expected to be required to update on a regular or continuous basis. Rather, the association and data management module 423 may communicate with outside sources to update the static data on a periodic or semi-periodic basis. Accordingly, such static data generally may not be expected to change in response to an event (although this may happen in some circumstances).

For example, a location database 430 may include an address of a loading dock, as well as addresses for possible sources of shipments that arrive at that loading dock. It should be understood that some location information may be considered dynamic (e.g., a current location of an object in transit), while other location information may be considered static (e.g., a manufacturing facility at which a particular object is made). In general, though, the static information will be considered not to change on an event-by-event basis.

Similarly, a product database 432 may include detailed descriptions of the products or objects that are being tracked, including such descriptions that change, but that, again, do not generally change on an event-by-event basis. The product database 432 may store such information, or may look up the information from an outside source, using, for example, a universal product id (e.g., the EPC code read from the tag 220 of the object 218).

A business process database 434 may include one or more business processes that are associated with the object. As referenced above, a business process may refer to a formalized workflow or progression of tasks/events that is designed to govern a lifetime of an object. For example, a business process model may be formalized for a manufacturing process, or for a distribution process, or for a customer return of defective merchandise process.

In such cases, the business process model may be designed at an abstract level at, for example, the back-end system 202, to govern a lifecycle of multiple objects through an entirety (or large portions) of their respective lifecycles. Then, specific sub-sets or instantiations of the business process model(s) may be implemented or monitored at the auto-id node 400, so that the business process model for a particular object represents the lifecycle and possible (anticipated) events that the object may experience. A particular example of this type of implementation is discussed below with respect to FIG. 6.

In other examples, there may not be a business process model or workflow that is defined at this level, and the rules, the dynamic data, and the static data may implicitly define the business process that will be experienced by the object.

A resource database 436 may include other resources for the event. For example, the resource database 436 may include resources that are available for implementing whatever action is required in response to an event. For instance, if an object is received at a warehouse that requires a special device for transporting the object, then the resource database 436 may store information regarding such a moving device that may be available on the premises of the warehouse.

Similar comments apply to other resources that may be useful in the management of objects throughout their lifecycle, so that, generally, whenever the rule engine 418 determines that an action is required, the resource database may be consulted to determine what resources are available for implementing that action.

Although the above implementations are discussed with respect to the division of dynamic data and static data, it should be understood that this division is merely one example. For example, the databases 430-436 may be used to store some or all of the dynamic data in addition to the static data, and, in this case, may simply be updated with the dynamically-changing data more frequently than in the above examples. For instance, to the extent that location data may represent either dynamic or static location information, as referenced above, then it should be understood that the location database 430 may be thought of as containing dynamic and/or static data.

The core services 402 also includes a configuration and administration management module 440 to configure and manage the auto-id node 400. For example, administration management module 440 may allow a user to upload more rule sets 420, 422, manage the integration logic with respect to modules 404-408, or establish connections with outside services (e.g., to update the static data storage 430-436). Index 442 indicates one or more associations between the auto-id node 400 and other auto-id nodes can be maintained, as explained in more detail below. Finally in FIG. 4, a storage and archiving management module 450 manages the data storage and archiving of the core services module 410. For example, the module 450 may be used to archive data that is used infrequently, or that has not been used for some predetermined time. In so doing, the module 450 may interact with an external storage site, so as to minimize resources needed at the auto-id node 400.

The above description of FIG. 4 is given with respect to the example of a timeline of a particular object or group of objects, where expected actions of the object(s) are matched with actual events. However, it should be understood that the rules, the timeline(s), and the other criteria may be implemented in terms of other parameters.

For example, rather than being object-specific, the auto-id node may operate with respect to a particular reader, or set of readers. For example, one reader may detect events from a plurality of objects' identifiers, so that the history 428, current state 426, and expected actions 424 may be defined with respect to the reader, and not with respect to any particular object read by that reader.

For instance, a Christmas display may sell many Christmas-related objects, and a reader may be located proximate to the objects to determine when the display is becoming depleted. In this example, the activity handler 414 may handle all activity that occurs with respect to the specific reader, and the rule set 420 may designate parameters for, for example, re-ordering inventory from a back room or from a manufacturer, or for replacing one type of object with another when the first type of object is sold out.

Thus, although the activity and process management module 410 may operate according to a number of different parameters and guidelines, it should be understood from the description and examples contained herein that the activity and process management 410 is operable to determine an expected or future event, and to wait until a corresponding event arrives that matches the expected event. In so doing, the activity and process management module 410 may process a number of events that do not match any expected events, in which case an alarm may be triggered, or, otherwise, no action need be taken.

Figure 5:
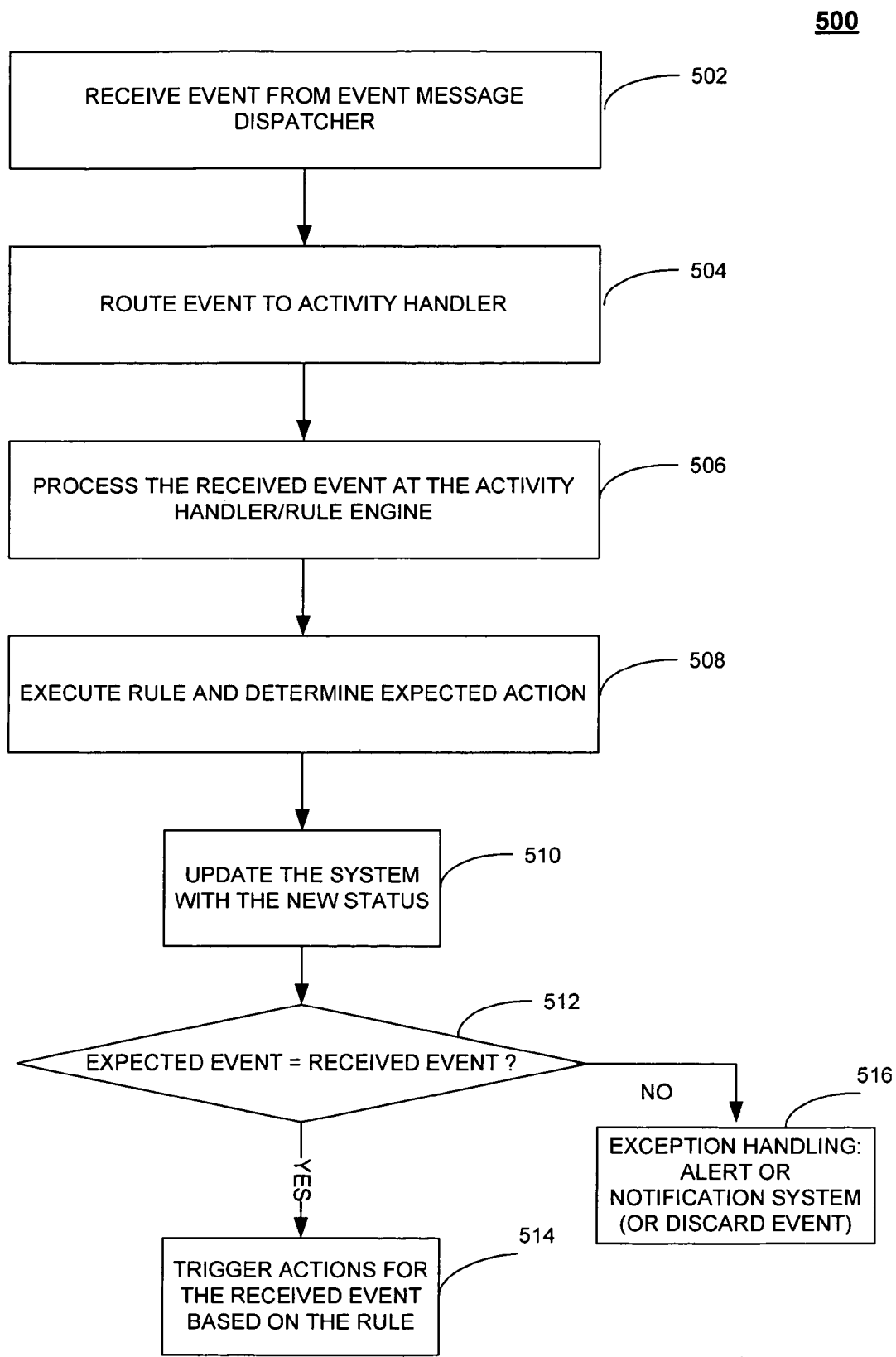
FIG. 5 is a flowchart illustrating a process of the auto-id node of FIGS. 2-4.

FIG. 5 is a flowchart illustrating a process 500 of the auto-id node of FIGS. 2-4, in which an auto-id node processes an event. In FIG. 5, initially, the event message dispatcher 412 receives an event (502) from one of the tracking devices 112-120, or from some other event-generating device. For example, a pallet of soda may arrive at a warehouse of a large retail store and be scanned by the RFID reader 114. An event is then generated that reflects an identify of the object (in this case, the pallet itself, and/or each individual can of soda) in the form of a data packet that is sent to the event message dispatcher 412.

The event message dispatcher 412 then uses information contained within, and/or associated with, the event to find an appropriate activity handler for the event (504). For example, the event message dispatcher 412 may determine that the activity handler 414 handles "receiving" types of events for pallets of soda. The event message dispatcher 412 thus passes the received event to the found activity handler.

The activity handler 414 receives the dispatched event and handles the event with the selected rules, e.g., the rule engine 418 and the rule set 420 (506). Specifically, the rule engine 418 analyzes the information of the event and the associated object so as to find, if any, appropriate rule sets that apply to the received event.

The rule engine 414 then execute the rule(s) 420 for the event, in order to determine the expected actions that should be taken in response to the received event (508). For example, continuing the above example, the rule set 420 may include rules for whether the shipment of soda is to be accepted at the specific warehouse, for stocking therein, or (if, for example, the specific warehouse is already fully stocked with soda) rejected and forwarded to another warehouse that may be short in its soda inventory. To name another example, the reception of the pallet of soda (or some other event) may trigger an end of a business process (at least for the discernable future, or as far as the particular auto-id node 400 is concerned with respect to the object).

The activity handler 414 then updates the auto-id system with the new status of the event (510). For example, a new location of the received object may be updated in both the location database 430 and the product database 432. Also, the business process status for the event may be updated in the expected action 424, current state 426 and history 428. For example, the expected action 424 may be updated with the newly calculated "expected action" from the rule engine 418, and the current state 426 may be updated with the "object received" event as the new current state, and previous state of the object (e.g., "in transit") may be put into the history 428.

The activity handler 418 then determines whether the received event may be matched with a future, expected action (512). If so, the activity handler completes handling the event/action by communicating the event to the related enterprise system, which may trigger more actions/processing in the enterprise system (514).

For example, the activity handler 414 may analyze the expected action 424 for the received object, and may then evaluate various criteria to determine whether future action should be taken, e.g., the rule set 420 may determine that: if the expected action for the object includes a stocking action, and if a location matches the received object's location, and if the current time stamp is within a valid time range of the event, and if the receiving warehouse is below expectations for a stocked quantity of soda, then the pallet of soda may be moved through the warehouse and stocked on the appropriate shelf. Of course, there may be more or less criteria than in the above example that is used to compare whether a received event may be matched with an expected action.

Furthermore, there may be one or more expected actions for the received event, in which case, for example, the activity handler 414 may loop through the list of expected actions until an expected action is found or the complete list is checked. For example, if the object is in transit to a final destination, there may be more than one possible transit locations for the shipment. Receiving the object in any one of the transit locations is qualified as a match to an expected action. As another example, the "received shipment" event may be communicated to a warehouse management system, so that the warehouse system may then update its inventory record, and, additionally or alternatively, the "received shipment" event may be communicated to the manufacture's management system, so that a status of the object may be changed to "shipped."

When the activity handler 418 fails to find an expected action that could match the received event, the activity handler may treat the received event as unexpected or an exception (516). The activity handler 414 may then, for example, send an alert to a user interface of a local operator, notifying the local operator of the unexpected action, or may trigger another exception handling system to report the unexpected action. On the other hand, if the event is also received by other activity handlers, then the activity handler 414 may determine that it is possible that the other handler(s) are responsible for processing the event(s), and may not issue an alarm.

As just described, the activity handler 414 and the rule engine 416 thus serve at least two primary and overlapping functions. First, they determine whether a received event matches an expected action, i.e., whether the event that just happened was supposed (expected) to happen. Second, if the event was supposed to happen, then the rule engine 416 determines whether any further action is supposed to take place in response to the expected action, and, if so, triggers the further action accordingly (or, alternatively, triggers an error alert).

Figure 6:
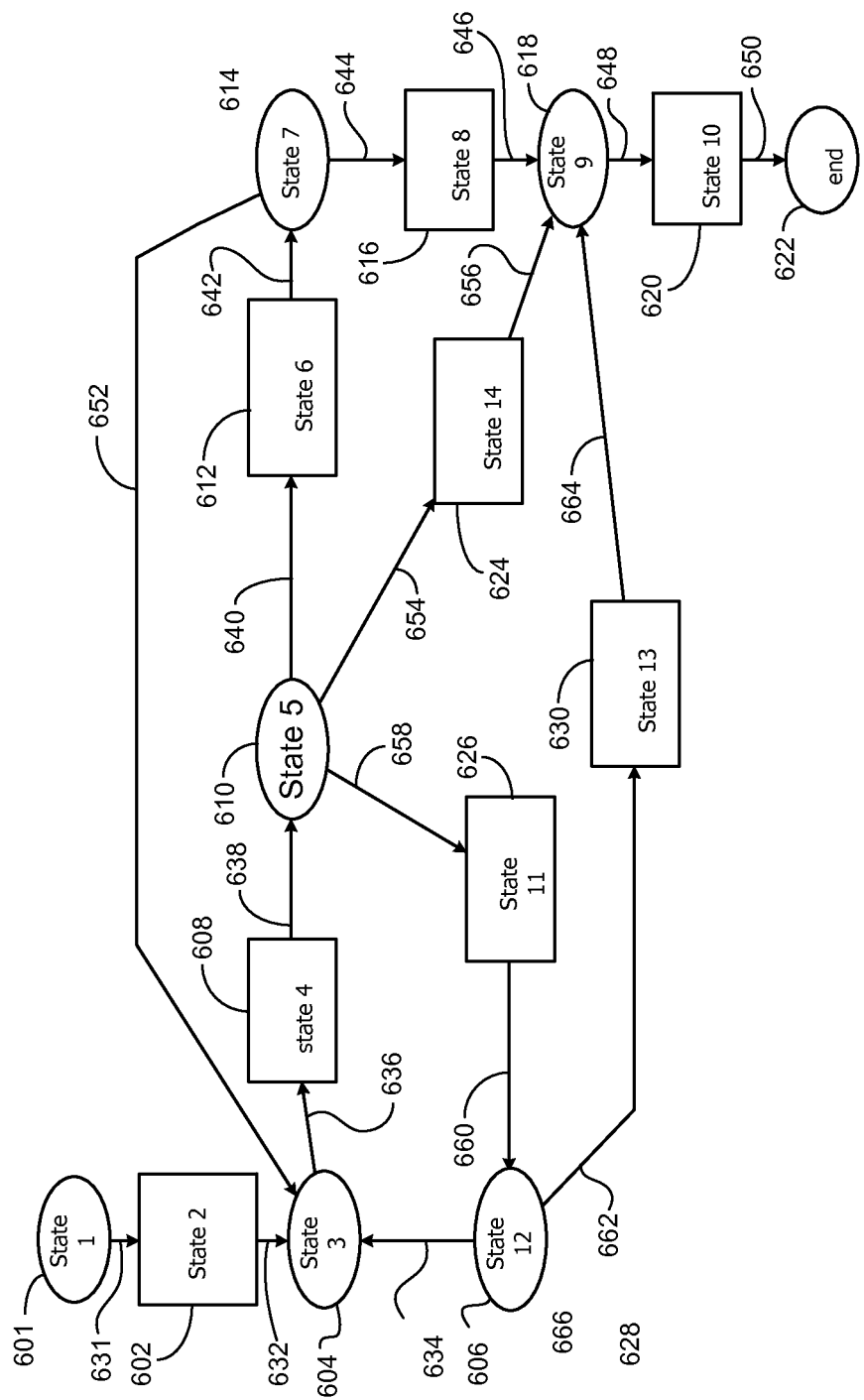
FIG. 6 is a block diagram of a business process model used in the process of FIG. 5.

FIG. 6 is a block diagram of a business process model 600 used in the process of FIG. 5 and associated with a physical object. As referenced above, the business process model 600 includes a sequence of states of an object and the event(s) that triggers any changes from one state to the next.

In FIG. 6, elements 601-630 represent a state that an object is in, or has been in at some point in the past, or may be in at some future time. More specifically, each rectangle-shaped element may represent a state that is part of a business process that is associated with the object, and/or with a lifecycle (or portion thereof) of the object. For example, "state 4" 608 may represent a state of "object in transit." Oval-shaped objects represent states for which the business process model contemplates that there may be multiple possibilities for events following therefrom, where such events are represented by multiple ones of transitional arrows 631-666 that links the various states 601-630.

As a result, FIG. 6 conceptually illustrates the features discussed above with respect to FIGS. 4 and 5, as to how the activity handlers 414, 416 manage the evolution of an object through multiple points along its timeline, and achieve the referenced functionality of first matching an event with an expected action, and then determining which future events should be triggered thereafter.

For example, the state 608 may represent a state of "in transit," so that the state 608 represents a current state 426 of the relevant object, and the event 638 represents an expected event of reading an RFID tag of the object at a reader located at a destination warehouse, while the state 610 represents an expected state of "at warehouse." Thus, if the activity handler 414 receives the event 638 at some point after the object has entered the state 608 "in transit," then the activity handler may use the appropriate rule engine/rule set to determine that the event 638 matches the expected action (event) of transporting the object to a specified warehouse. The rules in the rule set 620 may make such a determination based on, for example, a location of the relevant reader from which the event was generated, or a timing of the event, or an identify of the object itself.

Assuming the event matches the expected event (if not, an alarm may be triggered, or a decision to take not action may be made), then the activity handler switches a current state of the object to the state 610, and switches the state 608 to a history, or past, state. The activity handler then determines which of the possible, expected events 640, 654, and 658 should be experienced by object next.

In other implementations, an operator may determine which state 612, 624, or 626 will be experienced next, and then the activity handler may simply wait for one of the events 640, 654, or 658 to actually happen, and then select one of the states 612, 624, or 626, accordingly. In still other implementations, the operator may notify the activity handler 414 which of the states 612, 624, or 626 is to be expected, so that the activity handler 414 can determine when the corresponding event occurs.

It should be evident from FIG. 6 that there are many possible routes or timelines that a particular object may follow through the business process model 600, depending on, for example, how the rules are implemented. Further, an object's progression along a particular route may depend on its route to date, and also may depend on one or more future possible routes (states). As a result, by adding, removing, or modifying the rule sets 420 and 422, a route or lifecycle of an object may easily be managed in a number of situations and scenarios.

For example, FIG. 6 may represent a lifecycle for a package of meat or other agricultural product that is being shipped from a farm to a retail grocery store. The state 610 may represent a state of "at warehouse A," while the states of 612, 624, and 626 may represent states of "receiving facility in country A," "receiving facility in country B," and "receiving facility in country C."

The rules may be consulted to determine which of the states 612, 624, or 626 are possible, so that, for example, a corresponding event 640, 654, or 658 may be expected to be received. For example, agricultural restrictions may apply in some countries regarding limitations on importing meat or other agricultural products. As a result, if the activity handler 414 determines at the state 610 that the meat shipment originated from country Z in state 602, then this determination may apply a rule which restricts shipment into countries A and B (i.e., which limits a future action to the state 626, so that the event 658 becomes an expected event at a related auto-id node. Similar comments apply to rules which may be based on "future" states, such as a final destination state (e.g., retail grocery store) 622.

It should be understood that such rules regarding restrictions of shipments or other events/states may be dynamically modified. For example, if agricultural restrictions are lifted by an act of government of a particular country, then the rules may be modified to allow meat shipments to that country where none was previously allowed. However, in so doing, the basic architecture of the business process model and the auto-id node 400 is maintained. Similarly, more rules may be added in the business process for special handling instructions, or other additions/modification to the original business process and lifecycle of the specific product.

It should be understood that such rules may be added locally to an auto-id node, which enables the flexible adjustments of a common business rule to handle specific local business logic. This architecture may help the enterprise system, for example, to apply organization wide policies, while allowing variations at lower levels, e.g., a local auto-id level. This architecture also may help the enterprise system not to be burdened with the detailed management of the low level, local specific business process (represented in the format, for example, of rules or rule sets), even though the enterprise system may, if necessary, obtain information regarding the rule sets or other operations of the auto-id node(s). The architecture also provides an enterprise system with a scalable platform for growing the business process.

As another example of the flexibility of the architecture of the auto-id node of FIG. 4, it should be understood that the architecture allows for specific, time-limited application of desired rules, within the overall context of a business process. For example, in the example referenced above regarding a Christmas display during Christmas season, the rule set 422 may be uploaded to an auto-id node in a retail store's Christmas display that includes objects for sale.

The rule set may include a rule 422 that when the contents (objects) of the display drop below some selected amount, then additional units of the object should automatically be re-order from a particular manufacturer. After Christmas, this rule may be deactivated, or be replaced by a new rule that specifies a different inventory level to trigger a new order.

In the architecture of the activity and process management module 410, then, each removal of an object from the display may trigger an event from an associated RFID reader, and the event may be matched with an inventory activity handler, having the rule(s) associated with that reader. The rules then compare the remaining inventory with the "trigger" amount of inventory, and, when the "expected event" of less than the specified level of inventory is reached, then the activity handler triggers the order for more of the relevant object(s) of the display.

The architecture of the rule engine allows the rule updates to happen without disturbing the auto-id node from processing other events. For example, in a retail system, each promotion or sale event may be represented in a rule set, where new prices for a list of sales object may be determined from the rule(s). In a warehouse management system, seasonal objects' inventory level may be adjusted by applying different rule sets in different times of the year, or in different locations of the warehouse, depending on, for example, a local climate of the warehouse.

It should be understood that the business process model of FIG. 6 is but one representation of a framework for implementing the rules of the activity and process management module 410. Object or device states, and corresponding events, may be formalized according to some other framework, or may be implicit within the rules themselves.

Figure 7A:
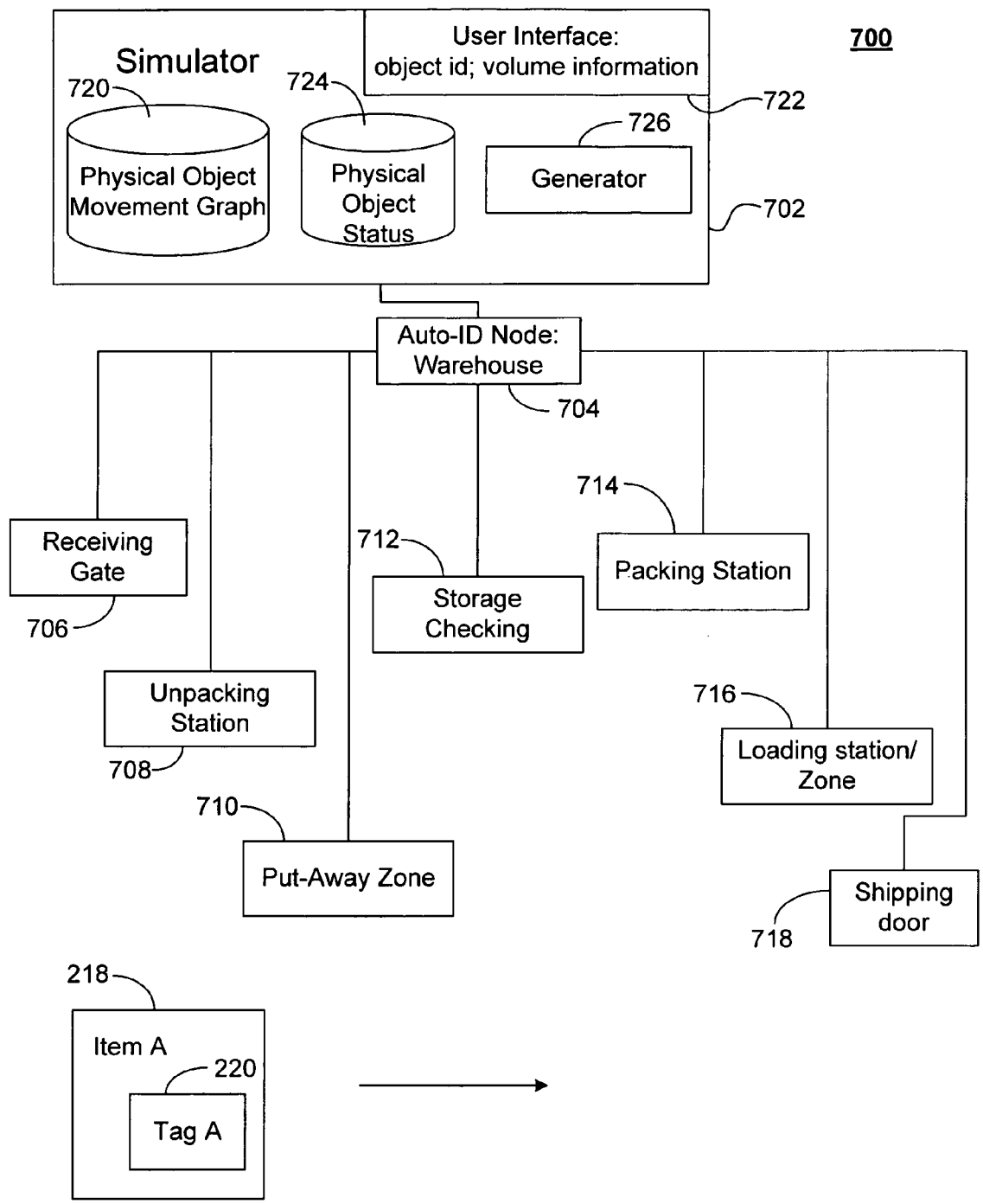
FIG. 7A is a block diagram of a tracking system used with the auto-id systems of FIGS. 1-4.

FIG. 7A is a block diagram of a auto-ID tracking system 700 used in a warehouse environment with the auto-id systems of FIGS. 1-4. In FIG. 7A, a tracker 702 is used to identify and monitor movement data corresponding to movements of one or more assets (e.g., physical objects) in a warehouse environment. More particularly, the movement data corresponds generally to movements of physical objects through a particular environment (e.g., the manufacturing, distribution, and/or retail environments of FIG. 2) associated with one or more auto-ids nodes. That is, the movement data corresponds to movement of an asset, or type of asset(s), through an environment (e.g., the environment of a raw materials supplier, a manufacturer, or a retailer) that is monitored and maintained by an auto-id node 704. For example, as shown in FIG. 7A, movement corresponding to movement of an asset through a warehouse environment is monitored and maintained by the auto-id node 704.

The warehouse environment, for purposes of this example in this description, generally is intended to receive, handle, store, and/or ship physical objects, as part of, for example, a supply chain. As such, the warehouse environment generally includes a plurality of data reading points 706-718, at which information regarding a physical object is read from, for example, the RFID tag 220 that is associated with the physical object 218 of FIG. 2.

It should be understood from the above description of FIGS. 1-4 that the various data reading points 706-718 shown in FIG. 7A correspond to, and/or may include, the various device controllers and/or readers of FIGS. 1 to 2. For example, a receiving gate 706 represents a data reading point at which the object 218 is received at the warehouse. The receiving gate 706 may include one or more of the device controllers 212 to 216, and/or one or more of the readers 112-120, such as, for example, the RFID reader 114. As a result, when the object 218 is received at the receiving gate 706, information, including identification information (e.g., an SKU number), is read from the tag 220 in the matter described with respect to FIG. 4. Then, as described with respect to FIG. 4, an event message may be generated at the receiving gate 706, and transmitted to the auto-id node 704.

The object 218 may then be forwarded to one or more of a plurality of remaining data reading points, such as, for example, an unpacking station 708, a put-away zone 710 (where shipments are "put away" in their entirety, without being unpacked), a storage checking facility 712, a packing station 714, a loading station 716, and/or a shipping door 718. Discussion of the functions of the various data reading points 706-718, to the extent not apparent, is provided in more detail below in the context of discussion of the function and operation of the tracker 702.

In general, though, it should be understood that the object 218 may encounter various ones of the data reading points 706-718 as the object 218 moves through the warehouse environment. For example, the object 218 may include a pallet with two cases of retail items. The object 218 may be received at the receiving gate 706, and unpacked in part at the unpacking station 708 to separate the two cases. Then, one case may be forwarded to the loading station 716, while the other is forwarded to the packing station 714 for repacking according to a different packaging scheme (e.g., placed on another pallet with another type of retail goods), before being sent to the loading station 716. Thereafter, both cases may be sent to the shipping door 718 for shipping.

Although FIG. 7A is discussed above in terms of a single one of each of the plurality of data reading points 706-718, it should be understood that such discussion is provided for the sake of clarity and simplicity. Within an actual warehouse environment, of course, there may be many ones of the receiving gate 706, or of any one of the plurality of data reading points 706-718, or of other data reading points.

Also, a particular data reading point, such as, for example, the put-away zone 710, may be associated with a general area (and multiple tracking devices), rather than with a single reading location, such as may be more likely to occur at a particular receiving gate (of course, there may be multiple readers at a particular receiving gate, as well).

Figure 7B:
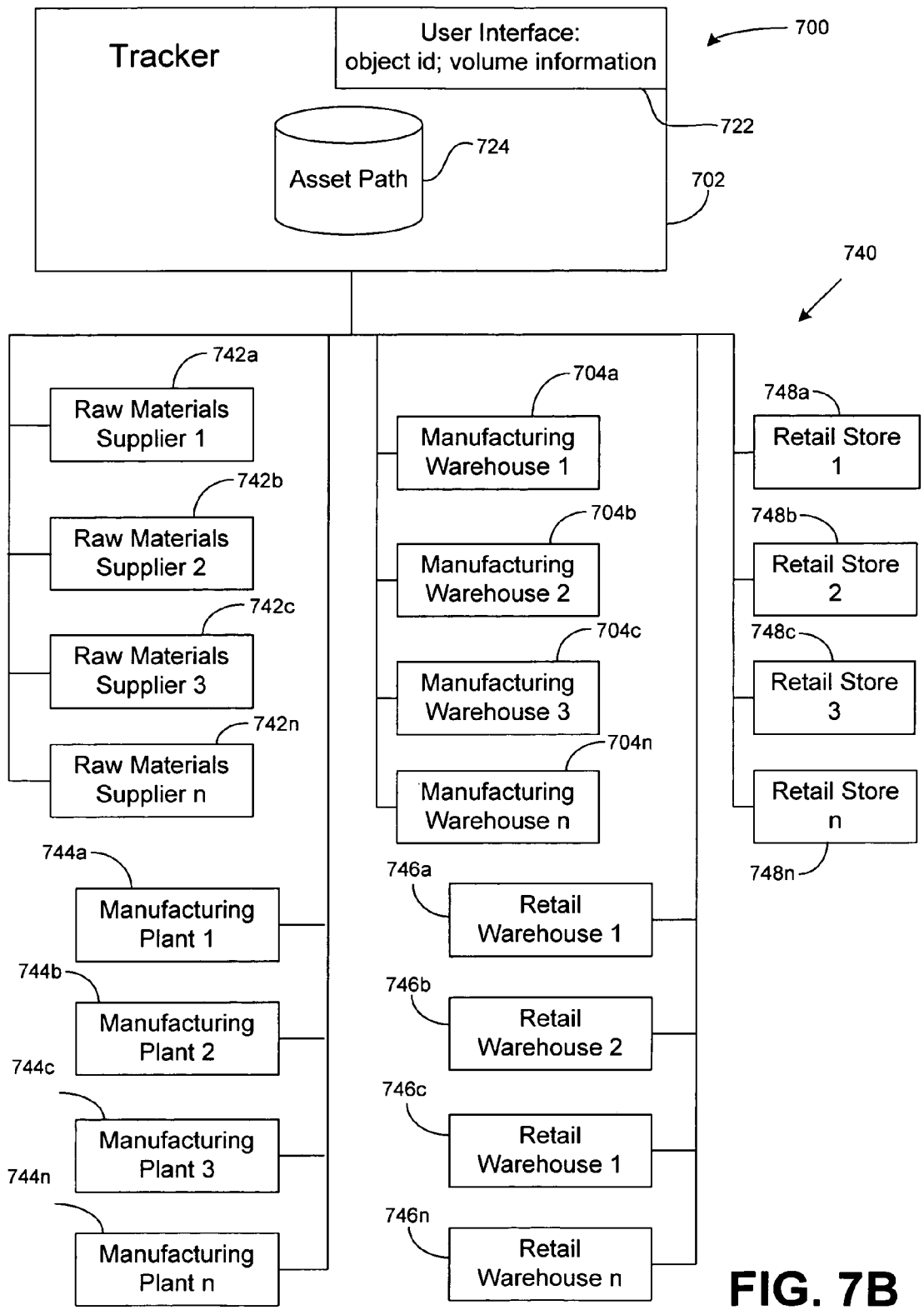
FIG. 7B is a block diagram of various environments through which a supply chain runs.

As shown in FIG. 7B, in addition to being linked to an auto-id node 704a associated with a warehouse environment, the tracker 702 of the auto-ID tracking system can be linked to multiple auto-id notes 742a-n, 744a-n, 704a-n, 746a-n, and 748a-n that are associated with different environments of a supply chain 740. In particular, the supply chain 740 can include one or more raw materials suppliers, manufacturing plants, warehouses of manufacturing distribution centers, warehouses of retail distribution centers, and retail stores, and one or more auto-id nodes can be associated with each of the environments. For example, auto-id nodes 742a, 742b, 742c, and 742n can be associated with different raw materials suppliers, different locations within the raw materials suppliers, or different processing steps at a raw materials supplier. Auto-id nodes 744a, 744b, 744c, and 744n can be associated with different manufacturing plants, different locations within the manufacturing plants, or different processing steps at a manufacturing plant. Auto-id nodes 704a, 704b, 704c, and 704n can be associated with different warehouses of a manufacturing distribution center, different locations within a warehouse (as explained above with respect to FIG. 7A), or different processing steps at a warehouse. Auto-id nodes 746a, 746b, 746c, and 746n can be associated with different distribution center warehouses of a retailer, different locations within a retailer's warehouse (as explained above with respect to FIG. 7A), or different processing steps at the retailer's warehouse. Auto-id nodes 748a, 748b, 748c, and 748n can be associated with different retailers, different locations within a retailer, or different processing steps at a retailer. Although not shown in FIG. 7B for the sake of clarity, each auto-id node 742a-n, 744a-n, 704a-n, 746a-n, and 748a-n associated with the various environments in the supply chain 740 can be connected to one or more data reading points in the supply chain 740, as is illustrated in the example shown in FIG. 7A, showing auto-id node 704 connected to data reading points 706-718.

Although the object 218 is illustrated as a single object having a single tag 220, it should be apparent from the above discussion that the object 218 also may represent a plurality of goods that may be manufactured or packaged together and/or a plurality of events that occur as an object moves through the supply chain 740. That is, as in the example just given, the object 218 may represent a pallet of goods that includes individual objects or cases, an assembly of materials, and or the completion of certain processing steps.

Various techniques for managing movements of the physical object 218 through the supply chain 740 should be apparent from the discussion of FIGS. 4-6 above. For example, a business process model such as the business model 600 of FIG. 6 may govern the movement of the physical object 218, based on, for example an origin or destination of the object 218, inventory requirements of a retail store associated with selling the object 218, or on some other business criteria or business logic.

As a result, a number of the event messages generated by the data reading points (e.g., 706-718) and received at the auto-id nodes 704 and 742-748 can be used to define a path of an object through the supply chain 740. For example, a business process model can define a path of an object 218 through a supply chain in which event messages are generated at particular data reading points (e.g., 706-718) and received by particular auto-id nodes (e.g., 742a, 744c, 704a, 746b, and 748n) in a particular order.

In one exemplary implementation, the business process model 600 can define a path through the supply chain 740 for a bottle of pharmaceutical pills. The path defined by the model 600 can require that raw materials are sourced from a particular raw materials supplier (e.g., 742a), that certain processing steps are followed by the raw materials supplier, that the pharmaceuticals are manufactured at a certain manufacturing plants (e.g., 744c) and that the raw materials move through particular manufacturing lines and are processed with particular techniques by the manufacturer, that the manufactured pharmaceuticals are warehoused and shipped from the manufacturing warehouse (e.g., 704a) following a particular routine, that the manufactured pharmaceuticals are received, stored, and shipped to a retailer by a particular retail warehouse (e.g., 746b) following a particular routine, and received, stored, and sold by a particular retailer (e.g., 748n) following particular procedures.

Movement of the object 218 through each point along the supply chain path defined by the business model 600 can be tracked and monitored by auto-id nodes 704 and 742-748. For example, as an asset (e.g., the bottle for pharmaceutical pills) moves through the supply chain, event messages reported from tracking devices 112-118 to auto-id nodes 742, 744, 704, 746, and 748 can be used to track the path of the object through the supply chain. The actual path of the asset though the supply chain can then be compared to the predetermined path defined by the business model to validate the progress of the asset through the supply chain.

However, a 100% successful reading rate with RFID devices cannot be expected and because of physical limitations and personnel errors, some reading points might miss the readings. Based on the predetermined flow path, the history data might be amended in order to provide more accurate data for process optimization, such as storage layout arrangement and task arrangement.

Furthermore, counterfeited or mishandled products may exist that have not followed the predetermined path. Based on the predetermined flow path, the system can identify those counterfeited or mishandled products in the supply chain.

Although the examples above primarily have been given with respect to a warehousing environment, it should be understood that the tracker 702 may be used with any of the described auto-id nodes, and with other auto-id nodes, such as, for example, retail, supply chain, manufacturing, or distribution auto-id nodes.

Moreover, the tracking techniques are scaleable, and may thus take advantage of the hierarchical nature of the auto-id infrastructure 110 described above in FIGS. 1-3. For example, tracking of progress through the supply chain may be performed across multiple auto-id nodes, or across an entire enterprise application, or across entire supply chains. Further, given the hierarchical nature of many assets (e.g., individual pills, bottles of pills, bottles within a case, cases within a pallet, pallets within a shipment), tracking may be run across multiple levels, as well.

As explained above, auto-id nodes 206, 208, 210, 400 can gather information about, e.g., the history 428 or current state 426 of one or more objects. In addition, the auto-id node 400 can maintain location information 430, product information 432, business process information 434, and other resource information 436. This information can be passed to an enterprise application 102, 104, or 106 for use, e.g., through an integration interface 404, 406, 408, or 427, or can be stored in a storage 450 of the auto-id node 400, from which it can be retrieved for later use. Thus, in a network of many auto-id nodes 400, a wealth of distributed information exists; however, the information is not necessarily centralized or organized for use by an enterprise or an enterprise application.

Figure 8:
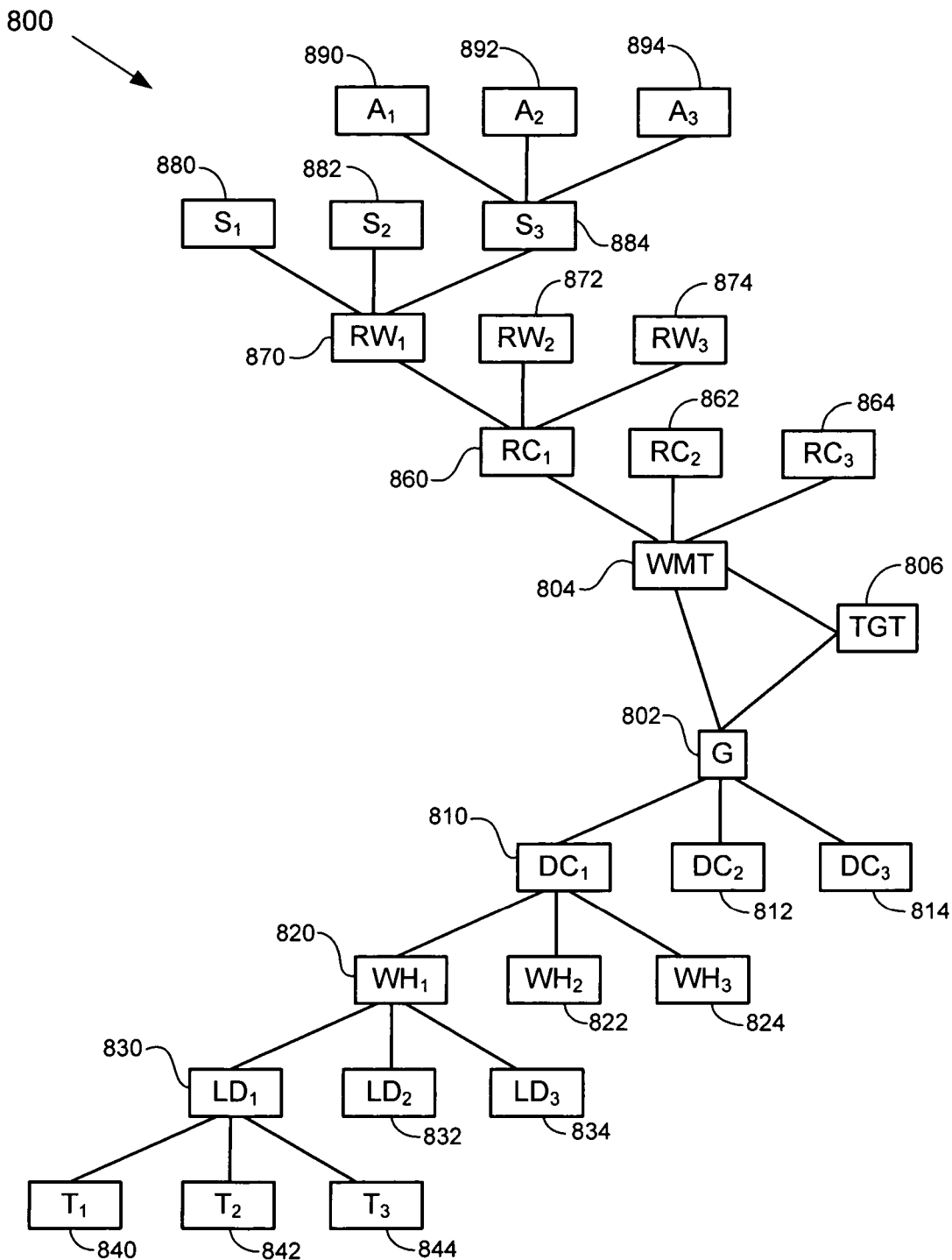
FIG. 8 is a block diagram of a network of auto-id nodes.

Referring to FIG. 8, a hierarchical structure of a network 800 of auto-id nodes 400 within one or more organizations can be defined to facilitate queries for information from the network 800 of auto-id nodes.

The exemplary network 800 shown in FIG. 8 includes auto-id nodes that operate within three related organizations 802, 804, and 806. For example, a first organization 802 can be a manufacturer of consumer goods (e.g., razor blades) that are shipped to competing superstore retailers 804 and 806 that sell the consumer products.

Auto-id nodes 810-844 of the first organization 802 can be organized in a hierarchy in which one or more auto-id nodes associated with one or more distribution centers 810, 812, and 814 are superior to one or more auto-id nodes associated with warehouses 820, 822, and 824. Each warehouse 820, 822, and 824 can be associated with one or more of the superior distribution centers 810, 822, and 824 and with one or more inferior loading docks 830, 832, and 834. Each loading dock 830, 832, and 834 can be associated with one or more trucks 840, 842, and 844 onto which pallets of consumer products are loaded from a loading dock 830, 832, or 834 for delivery to a superstore retailer 804 or 806. Each loading dock can also be associated with trucks 840, 842, and 844 that transport pallets of product.

The hierarchical structure of the auto-id nodes associated with different levels 810-844 of the first organization 802 can be defined and maintained by an indexing scheme imposed on the auto-id nodes. For example, one or more pointers that associate an auto-id node with one or more other auto-id nodes of a network 800 of auto-id nodes can be maintained in the index 442 of an auto-id node 400. The pointers can structure defining the hierarchical relationships between different auto-id nodes 400 within the network of nodes 800. The hierarchy can be dynamic, and the pointers stored in the indices 442 of different auto-id nodes can be changed to define different hierarchies for different purposes. For example, the first organization might make both men's razors and women's razors. Because the different products might be shipped from different distribution centers 810, 820, and 824 and stored in different warehouses 820, 822, and 824, pointers can be stored in the indices 442 of auto-id nodes 400 of the network to define different hierarchies to represent the distribution of the different products.

Similarly, auto-id nodes 860-894 of on of the superstore retainers 804 or 806 can be organized in a hierarchy in which auto-id nodes 860-894 contain one or more pointers in indices 442 that define the nodes as superior and/or inferior to other nodes. For example, auto-id nodes associated with one or more receiving centers 860, 862, and 864 can be superior to auto-id nodes associated with receiving warehouses 870, 872, and 874. One or more of the retail warehouses 870, 872, and 874 can be superior to one or more auto-id nodes associated with retail stores 880, 882, and 884, one or more of which can be superior to auto-id nodes associated with aisles or shelves 890, 892, and 894 within a store.

With the hierarchy imposed on the auto-id network 800 by the indexing scheme, information that is stored in the network 800 in a distributed fashion can be quickly and efficiently retrieved from the network. For example, auto-id nodes 400 can store history 428 and/or current state 426 objects that are detected by a node. Rather than, or in addition to, passing this information to a central database, the information can be stored in the storage 450 of individual auto-id nodes. Then, when the network 800 is queried for information about items that have been read by one or more auto-id nodes 400, the information can be extracted from the nodes by following the hierarchy imposed by the indexing scheme to drill down through the network 800 until the requested information is located and recovered.

For example, if the manufacturer 802 determines that certain products (e.g., as identified by particular serial numbers) that it has made and shipped are defective and must be recalled, the manufacturer can determine the location of the products by searching through the network in an organized and intelligent manner. The search can begin by querying the auto-id nodes 810, 812, and 814 to determine which distribution center the certain products are located in or have passed though. Distributions centers auto-id nodes that return a negative result to the query (e.g., distribution centers 862 and 864) and their inferior associated auto-id nodes can be eliminated from the search. For a distribution center 810 that returns a positive result to the query, inferior auto-id nodes 820, 822, and 824 that are associated with the distribution center 810 can be queried. Analogously, inferior auto-id nodes corresponding to 830, 832, and 834 loading docks associated with a warehouse 820 through which the products have passed can be queried, and so on. Thus, by following the hierarchical structure imposed on the network of nodes 800 by the indexing scheme the location of the defective products can be determined.

In addition to the intra-organization hierarchical structure described above, the indexing scheme can be extended to define an inter-organization hierarchical structure of auto-id nodes. For example, the second organization 804 can allow the first organization 802 to access information contained within the storages 450 of auto-id nods 860-894 that pertain to products made and shipped by the first organization 802 to the second organization. With such access, the first organization 802 can intelligently and efficiently query auto-id nodes 860-894 associated with the second organization in at top-down manner (i.e., beginning with nodes 860, 862, and 864 and proceeding to down the hierarchical structure) in addition to querying the nodes 810-844 of the first organization.

Furthermore, associations can be created between auto-id nodes 810-844 of the first organization 802 and nodes of the second organization to expand the hierarchical structure of the network of nodes 800. For example, when products from the first organization 802 are shipped by a truck 840 to the second organization 804, the products may be delivered by the truck 840 to a receiving center 860 or a receiving warehouse 870 of the second organization. Thus, auto-id nodes associated with the receiving center 860 and/or the receiving warehouse 870 can be inferior to a node associated with the truck 840 or the loading dock 830, from the point of view of the first organization 802.

The invention can be implemented in digital electronic circuitry, or in computer hardware, firmware, software, or in combinations of them. The invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks such as internal hard disks and removable disks; magneto optical disks; and CD ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back end component, e.g., as a data server, or that includes a middleware component, e.g., an application server, or that includes a front end component, e.g., a client computer having a graphical user interface or an Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. Accordingly, other implementations are within the scope of the following claims.

What is claimed is:

1. A system comprising:
a network of auto-id nodes, wherein each auto-id node comprises index data that defines a hierarchical relationship between the auto-id node and another auto-id node within the network, and wherein the auto-id nodes comprise a storage for storing dynamic data that includes status data and history data about one or more assets that have been read by the auto-id node, the dynamic data further including expected actions related to the status data about the one or more assets, the index data comprising pointers that are determined based on each of the one or more assets, the pointers being changeable to provide different hierarchical relationships between auto-id nodes, each hierarchical relationship representing a distribution of an asset within the network that is different from distributions of other hierarchical relationships, the index data providing a path for locating and recovering data about the one or more assets; and a processor operable to extract the data from the network of auto-id nodes by following the index data within the auto-id nodes to query only selected auto-id nodes within the network, wherein the selected auto-id nodes are arranged in a hierarchical network defined by indices of the auto-id nodes.

2. The system of claim 1, wherein the assets are associated with an identifier that is identified by the auto-id nodes.

3. The system of claim 2, wherein the identifier is an RFID tag.

4. The system of claim 1, wherein the auto-id nodes are operable to track a time at which the assets are identified with the auto-id node.

5. The system of claim 1, wherein the auto-id nodes further comprise an auto-identification device in communication with at least one node, and operable to receive data provided from the nodes about progress of the asset through the system.

6. The system of claim 1, wherein different auto-id nodes within the network of auto-id nodes are associated with different organizations.

7. The system of claim 6, wherein an auto-id node associated with a first organization is subordinate to an auto-id node associated with a second organization.

8. The system of claim 1, wherein the pointers comprise first pointers corresponding to a first asset and second pointers corresponding to a second asset.

9. The system of claim 8, wherein the first pointers define a first hierarchy that is different than a second hierarchy defined by the second pointers.

10. A method comprising:
   defining, by a processor, hierarchical relationships between different auto-id nodes in an auto-id system within a network of auto-id nodes that each comprise a storage for storing dynamic data that includes status data and history data about one or more assets that have been read by the auto-id node, the dynamic data further including expected actions related to the status data about the one or more assets;
   storing an index relating a first auto-id node to a second auto-id node in the first auto-id node, the index comprising pointers that are determined based on each of the one or more assets, the pointers being changeable to provide different hierarchical relationships between auto-id nodes, each hierarchical relationship representing a distribution of an asset within the network that is different from distributions of other hierarchical relationships, the index comprising index data providing a path for locating and recovering data about the one or more assets; and
   extracting the data from the network of auto-id nodes by following the index data within the auto-id nodes to query only selected auto-id nodes within the network, wherein the selected auto-id nodes are arranged in a hierarchical network defined by indices of the auto-id nodes.

11. The method of claim 10, further comprising associating the assets with an identifier that is identified by the nodes.

12. The method of claim 11, wherein in the identifier is an RFID tag.

13. The method of claim 10, further comprising storing timing data about a time at which an asset is identified by an auto-id node.

14. The method of claim 10, wherein different auto-id nodes within the network of auto-id nodes are associated with different organizations.

15. The method of claim 10, wherein the pointers comprise first pointers corresponding to a first asset and second pointers corresponding to a second asset.

16. The method of claim 15, wherein the first pointers define a first hierarchy that is different than a second hierarchy defined by the second pointers.

17. A non-transitory computer machine-readable storage medium comprising executable instructions for causing a one or more processors to:
   define hierarchical relationships between different auto-id nodes in an auto-ID system within a network of auto-id nodes that each comprise a storage for storing dynamic data that includes status data and history data about one or more assets that have been read by the auto-id node, the dynamic data further including expected actions related to the status data about the one or more assets,
   store an index relating a first auto-id node to a second auto-id node in the first auto-id node, the index comprising pointers that are determined based on each of the one or more assets, the pointers being changeable to provide different hierarchical relationships between auto-id nodes, each hierarchical relationship representing a distribution of an asset within the network that is different from distributions of other hierarchical relationships, the index comprising index data providing a path for locating and recovering data about the one or more assets; and
   extract the data from the network of auto-id nodes by following the index data within the auto-id nodes to query only selected auto-id nodes within the network, wherein the selected auto-id nodes are arranged in a hierarchical network defined by indices of the auto-id nodes.

18. The machine-readable storage medium of claim 17, further comprising executable instructions for causing the one or more processors to associate the assets with an identifier that is identified by the nodes.

19. The machine-readable storage medium of claim 18, wherein in the identifier is an RFID tag.

20. The machine-readable storage medium of claim 17, wherein different auto-id nodes within the network of auto-id nodes are associated with different organizations.

* * * * *